United States Patent [19]

Hoff

[11] Patent Number: 5,703,177
[45] Date of Patent: Dec. 30, 1997

[54] PARTIALLY CRYSTALLINE BLOCK COPOLYESTER-POLYAMIDES

[75] Inventor: Heinz Hoff, Tamins, Switzerland

[73] Assignee: Ems-Inventa AG, Zurich, Switzerland

[21] Appl. No.: 573,058

[22] Filed: Dec. 15, 1995

[30] Foreign Application Priority Data

Dec. 16, 1994 [DE] Germany ............ 44 44 948.8

[51] Int. Cl.$^6$ .................................................. C08G 81/00
[52] U.S. Cl. .................... 525/411; 525/425; 525/437; 525/450; 528/288; 528/323; 528/328; 528/335; 528/361
[58] Field of Search ................ 525/411, 425, 525/437, 450; 528/288, 323, 328, 335, 361

[56] References Cited

U.S. PATENT DOCUMENTS

| | | |
|---|---|---|
| 3,781,379 | 12/1973 | Theodore et al. . |
| 4,042,645 | 8/1977 | Hirota et al. . |
| 4,116,943 | 9/1978 | Ducarre . |
| 4,129,715 | 12/1978 | Chen et al. . |
| 4,588,785 | 5/1986 | Bax .......................... 525/419 |
| 5,258,407 | 11/1993 | Washburn et al. . |
| 5,381,172 | 1/1995 | Ujita et al. . |
| 5,446,109 | 8/1995 | Matsumura .................. 525/420 |

FOREIGN PATENT DOCUMENTS

| | | |
|---|---|---|
| 0 508 730 A1 | 10/1992 | European Pat. Off. . |
| 0 559 404 A1 | 9/1993 | European Pat. Off. . |
| 3435053 A1 | 4/1986 | Germany . |
| 4234305 A1 | 4/1994 | Germany . |
| 54-119593 | 9/1979 | Japan . |
| 54-119594 | 9/1979 | Japan . |
| 54-119595 | 9/1979 | Japan . |
| 54-120727 | 9/1979 | Japan . |
| 55-031207 | 8/1980 | Japan . |
| 56-022324 | 3/1981 | Japan . |
| 62-034952 | 2/1987 | Japan . |
| 62-135521 | 6/1987 | Japan . |
| 63-182343 | 7/1988 | Japan . |
| WO93/13814 | 7/1993 | WIPO . |

OTHER PUBLICATIONS

De Simone et al, *J. Poly. Sci.* 46: 1813–1820 (1992).
Shama et al., *Int. Biodeterioration Bull.* 17: 1–9 (1981).

*Primary Examiner*—Patricia A. Short
*Attorney, Agent, or Firm*—Hill, Steadman & Simpson

[57] ABSTRACT

This invention relates to biologically degradable, partially crystalline block copolyester-polyamides comprising at least two chemically differently structured segments of which at least one is a polyester (PES) block or a copolyester (coPES) block, preferably with a number average molecular mass of 340 to 10,000 g/mole, and at least one is a polyamide (PA) block or a copolyamide (coPA) block, preferably with a number average molecular mass of 400 to 3,000 g/mole. In addition, copolyester-amide (coPEA) blocks can be employed, preferably with a number average molecular mass of 500 to 5,000 g/mole. The invention also relates to a polycondensation process for the manufacture of these partially crystalline block copolyester-polyamides. The block copolymers described are useful for the manufacture of fibers, foils, molded articles and hot melt-type adhesives. Molded components manufactured from the copolymers in accordance with the invention are biologically degradable and are capable of being composted.

2 Claims, No Drawings

PARTIALLY CRYSTALLINE BLOCK COPOLYESTER-POLYAMIDES

FIELD OF THE INVENTION

The present invention concerns new biologically degradable, partially crystalline block copolyester-polyamides comprising at least two chemically differently structured segments of which at least one is a polyester (PES) block or a copolyester (coPES) block with a number average molar mass of 340 to 10,000 g/mole and a polyamide (PA) block or a copolyamide (coPA) block with a number average molar mass of 400 to 3,000 g/mole. In addition, copolyester amide (coPEA) blocks with a number average molar mass of 500 to 5,000 g/mole can also be used.

The invention also concerns a polycondensation process for the preparation of these partially crystalline block copolyester-polyamides as well as the use of the block copolyester-polyamides for the manufacture of fibers, foils, molded objects and hot melt adhesives.

Molded articles manufactured from the polymers in accordance with the invention are biologically degradable and are also capable of being composted and are therefore especially suitable for applications in, for example, the disposable packaging area, hygiene products and medicinal products.

BACKGROUND INFORMATION

Japanese Patent Applications JP 54-119593, JP 54-119594, JP 54-119595, JP 54-120727, and JP 80-031207 and European Patent publication EP 508 730 describe polyamides that are prepared via chain exchange reactions of high molecular polyesters and polyamides under the action of catalysts. Because of the thermodynamic incompatibility of the polyester (PES) and the polyamide (PA) and, to some extent, the very short residence times in the extruder, products are formed that are mixtures comprising PA, PES and polyester-amide (PEA). The ester bonds and the amide bonds are distributed randomly. These materials are characterized by their high cost of manufacture due to the high molecular weight starting materials, their undefined structure resulting, especially, from their non-uniform block length and distribution, and their generally unsatisfactory mechanical properties and only moderate biological degradability.

EP 559 404 describes hydrolysis-sensitive polyamides that are prepared via the extrusion of high molecular weight polyamides with low molecular weight alkyl esters of aliphatic carboxylic acids. In this case also, random polyester-amides result which have only a very limited concentration of ester bonds.

PCT publication WO 93/13814 describes a bio-absorbable PEA for medicinal applications. The strictly alternating sequence of the components is achieved via a two stage synthesis: first of all, a diamine is reacted with glycolic acid to give the corresponding diamide-diol that is then condensed with carboxylic acid dichlorides to give the high molecular weight PEA. Both reaction steps are carried out in solution.

J. Appl. Polym. Sci., 46, 1813 (1992) describes polyesteramides that contain L-lactide sequences. Lactide oligomers, diamines and carboxylic acid dichlorides are reacted in chloroform in order to synthesize these PEA so that random multi-block copolymers are formed. An essential aspect is that the OH-terminated lactide oligomer has to be re-functionalized in the first reaction step using an excess of acid dichloride. Such polymers are obtainable only via an expensive synthesis.

Based on the quantity of acid, the block copolyester-amide that is described in DE 34 35 053 contains at least 50 mole-% terephthalic acid in the OH-terminated PES block. The PEA in accordance with U.S. Pat. No. 4,116,943 contains 100 mole-% of aromatic dicarboxylic acids. Such a high proportion of aromatic monomers considerably reduces the rate of biological degradation or leads to bio-resistant materials.

U.S. Pat. No. 4,129,715 describes the synthesis of segmented PEA using carboxyl-terminated PES and diisocyanates.

The PEA in accordance with DE 42 34 305, which are used as hot melt adhesives, are also manufactured in accordance with the isocyanate method. The hard segments of these polyester-amides consist of amide sequences with only two amide groups that are formed via the reaction of the acid end-groups of the oligo-esters with aliphatic or cycloaliphatic isocyanates. The proportion of ester segments amounts to 80 to 95 % by weight as a result of which, in essence, the polyester-based properties dominate.

The PEA or manufacturing processes that have been described previously have distinct disadvantages or deficiencies. The preparation of PEA that are based on high molecular PA and PES is cost-intensive and generates products with an undefined composition and structure. As a rule, this also engenders unsatisfactory properties and, in particular, deficient biodegradeability. The use of solvents, acid chlorides, special reagents and multi-stage reactions is expensive and also generates expensive products, and these reactions are suitable only to a limited extent for large scale industrial production processes. Higher proportions of aromatic monomers reduce the tendency to biodegrade or eliminate it completely.

SUMMARY OF THE INVENTION

Thus, an object of the present invention is to provide new, partially crystalline block copolyester-polyamides comprising at least two chemically differently structured segments, which advantageously exhibit a defined structure, which may be produced by a simple method of synthesis, and which avoid the aforementioned disadvantages of the prior art. The block copolyester-polyamides of the invention also exhibit improved mechanical and thermal properties.

In addition, a process is disclosed for the manufacture of the block copolyester-polyamides of the invention.

Molded articles, foils, fibers and hot melt adhesives may be prepared using the polymers of the invention, and such products will also be distinguished by their ability to naturally degrade after their use, e.g., in a composting system.

These objects are achieved by the partially crystalline block copolyester-polyamides as disclosed herein and defined in claim 1, by a process for preparing such polymers as disclosed herein and defined in claim 23, and by the use of such polymers to prepare molded articles, hot melt adhesives and other products as disclosed herein and defined in claims 24–25. Additional advantageous embodiments of the invention are defined in the dependent claims.

DETAILED DESCRIPTION OF THE INVENTION

The present invention concerns segmented block copolyester-polyamides comprising at least two chemically differently structured segments or blocks of which at least one is a polyester (PES) block or a copolyester (coPES) block with a number average molar mass of 340 to 10,000 g/mole or, preferably, 340 to 6,000 g/mole or, more preferably, 340 to 3,000 g/mole or, most preferably, 340 to 1,500 g/mole, and a polyamide (PA) block or a copolyamide (coPA) block with a number average molar mass of 400 to 3,000 g/mole or, preferably, 400 to 2,000 g/mole or, more preferably, 1,000 to 2,000 g/mole. In addition, coPEA blocks with a number average molar mass of 500 to 5,000 g/mole can also be employed. A maximum number average molar mass for the PA segment and a minimum number average molar mass for the PES segment are preferred. PA blocks and PES blocks are predominantly assembled from aliphatic monomer components and contain not more than 20% of aromatic monomers, e.g., isophthalic acid units and terephthalic acid units. The linking of the blocks takes place by condensation. The PA blocks and coPA blocks that are used are preferably carboxyl-terminated and have at least 95% carboxyl terminal-groups whereas the PES blocks, the coPES blocks and the coPEA blocks are preferably OH-terminated and have at least 95% of OH terminal-groups. PES blocks or coPES blocks or coPEA blocks have a functionality of at least two or, especially, 2 to 4. The constituent blocks are typically prepared from monomeric starting materials.

The invention also concerns a process for the manufacture of block copolyester-polyamides. The polyamide-forming components are pre-polymerized to an exactly defined number average molar mass in the conventional manner and are condensed in the finished state in the melt under a vacuum after the addition of defined PES blocks, coPES blocks or coPEA blocks. In this connection, the pressure and temperature regimen and the catalyst and the catalyst concentration are formulated in such a way that absolutely no exchange reaction takes place and thus the PEA segments and the PES segments have the same average molar masses and molar mass distributions prior to and after condensation. Because of the relatively short block lengths of the pre-condensates, adequate admixture of the components is achieved even at the start of the condensation process, and this is reflected in spontaneous reaction of the oligomeric components and in short reaction times.

As has been stated above, the pressure and temperature regimen and the catalyst concentration are adjusted in such a way that the number average molar masses of the polymer blocks that are used are not changed during the second polycondensation step. In the initial step of the process in accordance with the invention (pre-polymerization), temperatures of 180° C. to 260° C. are applied together with a pressure in the range from atmospheric pressure to 18 bars. In the second polycondensation step of the process in accordance with the invention, the temperature is preferably kept in a range of 180° C. to 260° C.; the pressure is relieved in stages and then a vacuum is applied. In the process in accordance with the invention, the catalyst can be used in quantities of 0.05 to 0.2% by weight based on the total mixture.

The required polyamide segments are based on polyamide 6, 6/6, 6/9, 6/10, 6/11, 6/12, 6/36, 11, 12, 12/12 and on copolyamides and multi-polyamides based on $C_2$–$C_{44}$ dicarboxylic acids, especially dicarboxylic acids with 2 to 18 carbon atoms and dicarboxylic acids with 36 carbon atoms and with 44 carbon atoms and $C_2$–$C_{10}$ diamines as well as lactam-6, lactam-12, isophthalic acid (IPS) and terephthalic acid (TPS), whereby the concentration of the aromatic acids does not exceed 20 mole-%. The PA blocks can also be obtained via the polycondensation of the appropriate salts of a diamine and a dicarboxylic acid.

By using an excess of dicarboxylic acids, carboxyl-terminated PA blocks are generated and, by using an excess of diamines, amino-terminated PA blocks are generated. An essential aspect in regard to the materials in accordance with the invention, especially the biologically degradable materials, is that the number average molar mass of the PA blocks does not exceed 3,000 g/mole or, preferably, does not exceed 2,000 g/mole.

The polymer segments are obtained via the polycondensation of predominantly linear aliphatic dicarboxylic acids or their esters with linear and/or branched aliphatic alcohols as well as from lactones and hydroxycarboxylic acids. In a preferred embodiment, the polyester blocks and copolyester blocks are prepared from lactones or hydroxycarboxylic acids and have a functionality of more than 2 by using low proportions of higher functional aliphatic alcohols. The polyester blocks or copolyester blocks are also preferably prepared from bifunctional alcohols, especially those with 2 to 10 carbon atoms, and from dicarboxylic acids, especially those with 2 to 44 carbon atoms and, particularly, from dicarboxylic acids with 2 to 18 carbon atoms and with 36 carbon atoms and with 44 carbon atoms.

Suitable dicarboxylic acids for the synthesis of the PES segments include succinic acid, glutaric acid, adipic acid, pimelic acid, azelaic acid, sebacic acid and dodecanedicarboxylic acid; suitable diols include ethylene glycol, 1,3-propanediol, 1,2-propanediol, 1,4-butanediol, 1,5-pentanediol, 1,6-hexanediol, 1,8-octanediol, 1,10-decanediol, diethylene glycol, dipropylene glycol and glycerine, trimethylolpropane and neopentyl glycol; suitable lactones include caprolactone and butyrolactone. $\alpha,\omega$-dihydroxy-polyesters that are based on oligomers of $\alpha$, $\beta$, $\gamma$ and $\omega$-hydroxy-carboxylic acids, and their co-oligomers obtained via ring-opening polymerization of cyclic esters and lactones, are preferred. Especially preferred cyclic esters of this type are L,L-dilactide, D,D-dilactide, D-L-dilactide, diglycolide or the lactones $\beta$-R-butyrolactone, $\beta$-S-butyrolactone, $\beta$-rac-butyrolactone and caprolactone or their mixtures. Ring opening takes place with aliphatic alcohols having a functionality of 2 to 4 and a chain length of $C_2$–$C_8$. The concentration and the functionality of the alcohols that are used determine the molar mass and the functionality of the macro-alcohols that are formed.

For the synthesis of random copolyester-amide segments, the same monomers that have already been described as components of the PA segments and the PES segments can be used. In addition, $C_2$–$C_8$ amino-alcohols, such as ethanolamine and 1,3-propanolamine, may be used. The designated polymers are preferably reacted with an excess of diols in a simultaneous reaction, whereby randomly OH-terminated copolyester-amides result. The ratio of amide/ester bonds decisively influences the degree of phase separation between the hard segments and soft segments, which, in turn, affects the thermal and mechanical properties as well as properties relevant to biodegradation. In accordance with the invention, the ester/amide ratio of the PEA segments should not be below 1.2; and it should preferably lie between 1.2 and 20.0.

The block copolyester-polyamides of the invention consist of at least one PES segment and one PA segment/coPA segment and, optionally, a coPEA segment. The individual segments are preferably linked together by ester bonds.

Advantageously segment combinations such as PES1/PES2, PES1/coPEA and PES1/PES2/coPEA can be used.

These PES1 and PES2 ester blocks within a block copolyester-polyamide are distinguished from one another on the basis of their number average molar mass and/or their chemical composition and/or their functionality or combinations thereof.

The incorporation of coPEA segments, in particular, is also important for controlling the properties of the resultant materials. An important feature of random coPEA segments is their ester/amide ratio, since the extent of phase separation can be adjusted via this feature. The ester/amide ratio should not be below 1.2; and it should preferably be between 1.2 and 20.

The block copolyester-polyamides in accordance with the invention have an ester/amide ratio in the range from 15 to 0.2 or, preferably, between 15 and 0.6 or, most preferably, from 4 to 0.37.

Materials can be prepared with completely different properties as a result of varying the two ester/amide ratios.

An additional means for controlling the properties of the materials is via the use of PES segments and coPEA segments that have a functionality that is greater than 2. Depending on the relative concentration of the components, branched or cross-linked block copolyester-polyamides may be obtained in this way.

Because of the thermodynamic incompatibility of the segments, phase separation occurs on cooling the block copolyester-polyamide melts.

The polyamide segments form the hard segments and the polyester segments form the soft segments.

By varying the ester/amide ratio and the molar mass of the hard segments and the soft segments, block copolyester-polyamides may be produced which exhibit a range of properties extending continuously from the PA profile to the PES profile. Medium compositions with distinct phase separation exhibit the properties of thermoplastic elastomers.

The degree of phase separation can be controlled by the incorporation of coPEA segments. In order that the block copolyester-polyamides should possess the properties in accordance with the invention, especially biological degradability, the ester/amide ratio within the incorporated coPEA segments must not be below 1.2.

In the case of linear block copolyester-polyamides, the crystallite size of the PA micro-domains is affected only a little by the chemical composition and the molar mass of the other component blocks. The melting point of the block copolyester-polyamides therefore deviates only slightly from the melting point of the pure PA blocks (pre-condensates). High melting points may be achieved as a result of the partial crystallinity of the block copolyester-polyamides.

Relative to the linear analogs, branched or partially cross-linked block copolyester-polyamides exhibit a depression in melting point linked directly to the concentration and the functionality of the PES segments and the coPEA segments.

Because of the structure of the block copolyester-polyamides, a more or less pronounced phase separation occurs on cooling, whereby the PA segments form cross-linkages as a result of crystallization, and the PES segments and the coPEA segments are predominantly present in the amorphous phase. The more pronounced or distinct the phase separation, the more the modulus and the hardness of the block copolyester-polyamides are reduced in comparison to the pure PA.

A broad spectrum of properties can be achieved by varying the proportions of hard segments and soft segments, their composition, molar mass and molar mass distribution. In essence, the soft segments determine the resistance to hydrolysis and their flexibility at low temperatures.

Linear block copolyester-polyamides possess the melting point of the pure polyamide blocks (90° C. to 265° C.); branched or cross-linked types have lowered melting points depending on the concentration of the higher functional component blocks.

The degree of crystallinity of the copolyester-polyamides depends markedly on the composition and the number average molar mass and the functionality of the PES blocks and the coPEA blocks that are used. When using coPEA segments, the crystallinity increases super-proportionally as a result of the intensified interactions between the phases.

As already mentioned above, the soft segments essentially determine the hydrolysis characteristics of the block copolyester-polyamides. The experiments herein have shown, surprisingly, that the hydrolysis characteristics of the PES segments and the coPEA segments are changed only a little relative to the pure polyester polymer or coPEA polymer, even in the case of small proportions of soft segments. Similar rate constants were measured for the pure blocks and the incorporated blocks. The ratio of the rate constants for polyester segments and polyamide segments amounts to approximately 4.5.

In regard to the partially crystalline block copolyester-polyamides according to the invention, it is preferred that at least two linear polyester blocks or copolyester blocks are present whose number average molar masses differ by at least 500 g/mole or, preferably, by 1,000 g/mole. It is also preferred that at least one linear polyester block or copolyester block is present with a number average molar mass of 500 to 10,000 g/mole and at least one higher functional polyester block or copolyester block with a number average molar mass of 340 to 3,000 g/mole. Moreover, at least one random copolyester block can also be present with a uniform number average molar mass between 500 and 5,000 g/mole.

The block copolyester-polyamides according to the invention have properties that are similar to those of a polyamide, but they are, nevertheless, more readily degradable by an order of magnitude. In order to ensure biodegradability, it is necessary that the segments comprising the copolyester-polyamide adhere to the composition defined herein, that is:

at least one polyester block or copolyester block is present with a uniform number average molar mass between 340 and 10,000 g/mole, and at least one polyamide block or copolyamide block is present with a uniform number average molar mass between 400 and 3,000 g/mole, and, optionally, a copolyester-amide block is present with a uniform number average molar mass between 500 and 5,000 g/mole.

The block copolyester-polyamides in accordance with the invention are suitable for the preparation of fibers, foils, molded objects and hot melt adhesives. Molded articles can be manufactured by blow molding, extruding, injection molding and melt spinning. Hot melt adhesives may be produced from the partially crystalline block copolyester-polyamides by any known manufacturing method. Surprisingly, the block copolyester-polyamides prepared in accordance with the invention, not only exhibit very good mechanical and thermal properties and a ready processability but are also as rapidly or more rapidly biologically degraded than the corresponding high molecular weight polyamides, polyesters and random polyester-amides. Holes, fissure formation and a marked decline in strength and elasticity are found even after 2 weeks of residence in a standard composting system. After 6 to 12 weeks of composting, almost all the samples that were investigated had disintegrated to such an extent that absolutely no residues or fragments could be found. Since sieves with a mesh width of 2×2 mm were employed, any residual polymer constituents that were still present after this period must have had an edge length of under 2 mm. Since it is known, from the work of G. Shama, D. A. J. Wase, *Int. Biodeterioration Bull.*, 17, 1–9 (1981), that oligomers based on aliphatic polyamides and polyesters with a low degree of polymerization are capable of biological degradation, it follows that degradation of the copolyester-polyamides described herein occurs in the same medium, following the enzymatic and hydrolytic decomposition of the block copolyester-polyamides into oligomers. Thus, on the basis of samples composted for 4 weeks, it was possible to demonstrate via analyses of the composition and of the molar mass distribution that the polyester segments and polyamide segments had clearly been attacked and had already been partially degraded. As was the case with the hydrolysis experiments, one can observe two different degradation rates for the polyester segments and polyamide segments during composting.

Thus, in accordance with the invention, it has been possible to successfully provide a product that represents a good balance between economy of synthesis, excellent combination of physical properties and biological degradability.

The block copolymers that have been claimed herein permit a unique combination of good thermal and mechanical properties, ease of processing and complete biological degradation, as well as a range and variety of properties that have never previously been described. In addition, the block copolyester-polyamides according to the invention are capable of being manufactured in a straightforward manner using current industrial synthesis processes and using commercially available monomers.

The invention will now be described with reference to the following examples, which are provided by way of illustration and not limitation.

EXAMPLES 1 to 17

Example 1

185.2 g of AH salt, 136.7 g of hexamethylenediamine (60%) and 208.2 g of azelaic acid were condensed to give a pre-polymer under a nitrogen atmosphere at temperatures of 180° C. to 250° C. 400.0 g of polycaprolactone-diol with an average molar mass of approximately 1,000 g/mole and 0.65 g of an esterification catalyst (e.g., dibutyltin acid) were introduced, with stirring, into the melt comprising the coPA pre-polymer. A vacuum was applied; the final pressure was approximately 1 mbar. After reaching the desired viscosity (1.4–2.0), the condensation reaction was interrupted by breaking the vacuum and the melt was removed. Depending on the final viscosity desired, the condensation times generally amounted to 1 to 3 hours.

Example 2

130.7 g of AH salt, 96.5 g of hexamethylenediamine (60%) and 147.0 g of azelaic acid were condensed to give a pre-polymer under a nitrogen atmosphere at temperatures of 180° C. to 250° C. 525.0 g of polycaprolactone-diol with an average molar mass of approximately 2,000 g/mole and 0.8 g of an esterification catalyst were introduced into the melt comprising the coPA pre-polymer, with stirring. A vacuum was applied; the final pressure was approximately 1 mbar.

Example 3

152.5 g of AH salt, 112.6 g of hexamethylenediamine (60%) and 171.4 g of azelaic acid were condensed to give a pre-polymer under a nitrogen atmosphere at temperatures of 180° C. to 250° C. 153.1 g of polycaprolactone-diol with an average molar mass of approximately 1,000 g/mole and 306.3 g of a polycaprolactone-diol with an average molar mass of approximately 2,000 g/mole as well as 0.8 g of an esterification catalyst were introduced, with stirring, into the melt comprising the coPA pre-polymer. A vacuum was applied; the final pressure was approximately 1 mbar.

Example 4

152.5 g of AH salt, 112.6 g of hexamethylenediamine (60%) and 171.4 g of azelaic acid were condensed to give a pre-polymer under a nitrogen atmosphere at temperatures of 180° C. to 250° C. A mixture comprising 102.0 g of polycaprolactone-diol with an average molar mass of approximately 1,000 g/mole and 409.0 g of a polycaprolactone-diol with an average molar mass of approximately 2,000 g/mole, as well as 0.8 g of an esterification catalyst, were introduced, with stirring, into the melt comprising the coPA pre-polymer. A vacuum was applied; the final pressure was approximately 1 mbar.

Example 5

191.2 g of AH salt, 141.2 g of hexamethylenediamine (60%) and 176.1 g of azelaic acid were condensed to give a pre-polymer under a nitrogen atmosphere at temperatures of 180° C. to 250° C. 210.1 g of polycaprolactone-diol with an average molar mass of approximately 1,000 g/mole and 0.8 g of an esterification catalyst were introduced, with stirring, into the melt comprising the coPA pre-polymer. A vacuum was applied; the final pressure was approximately 1 mbar.

Example 6

134.9 g of AH salt, 101.2 g of hexamethylenediamine (60%) and 192.0 g of azelaic acid were condensed to give a pre-polymer under a nitrogen atmosphere at temperatures of 180° C. to 250° C. 536.2 g of polycaprolactone-diol with an average molar mass of approximately 1,000 g/mole and 0.8 g of an esterification catalyst were introduced, with stirring, into the melt comprising the coPA pre-polymer. A vacuum was applied; the final pressure was approximately 1 mbar.

Example 7

115.6 g of AH salt, 86.8 g of hexamethylenediamine (60%) and 164.6 g of azelaic acid were condensed to give a pre-polymer under a nitrogen atmosphere at temperatures of 180° C. to 250° C. A mixture comprising 221.8 g of polycaprolactone-diol with an average molar mass of approximately 1,000 g/mole and 404.1 g of a polycaprolactone-diol with an average molar mass of approximately 2,000 g/mole as well as 0.8 g of an esterification catalyst were introduced, with stirring, into the melt comprising the coPA pre-polymer A vacuum was applied; the final pressure was approximately 1 mbar.

Example 7a

A PO-500 sieve fraction of the copolyester-copolyamide from Example 7 was used as a hot melt adhesive. The material was coated at a coating weight of 20 g/m² and the coating was baked by means of an infrared emitter. In order to determine the original adhesion, a layered material comprising cotton with an upper material comprising polyester/wool blend with a wool content of approximately 10 to 15% was compressed at 165° C. (joining temperature). The original adhesion was determined after 24 hours of storage in a climatically controlled room. It amounted to 6.7 N/5 cm.

Example 8

78.0 g of AH salt, 58.5 g of hexamethylenediamine (60%) and 158.6 g of azelaic acid were condensed to Sire a pre-polymer under a nitrogen atmosphere at temperatures of 180° C. to 250° C. 548.0 g of polycaprolactone-diol with an average molar mass of approximately 1,000 g/mole as well as 0.8 g of an esterification catalyst were introduced, with stirring, into the melt comprising the coPA pre-polymer. A vacuum was applied; the final pressure was approximately 1 mbar.

Example 9

185.2 g of AH salt, 136.7 g of hexamethylenediamine (60%) and 208.2 g of azelaic acid were condensed to give a pre-polymer under a nitrogen atmosphere at temperatures of 180° to 250° C. A mixture comprising 380.0 g of polycaprolactone-diol with an average molar mass of approximately 1,000 g/mole and 404.1 g of a polycaprolactone-diol with an average molar mass of approximately 1,000 g/mole and 10.0 g of a trifunctional polycaprolactone-polyol with a molar mass of approximately 1,000 g/mole as well as 0.65 g of an esterification catalyst were introduced, with stirring, into the melt comprising the coPA pre-polymer. A vacuum was applied; the final pressure was approximately 1 mbar.

Example 10

238.8 g of AH salt, 45.5 g of hexamethylenediamine (60%) and 132.0 g of azelaic acid were condensed to give a pre-polymer under a nitrogen atmosphere at temperatures of 180° to 250° C. 370.0 g of polycaprolactone-diol with an average molar mass of approximately 1,000 g/mole as well as 0.8 g of an esterification catalyst were introduced, with stirring, into the melt comprising the coPA pre-polymer. A vacuum was applied; the final pressure was approximately 1 mbar.

Example 11

356.8 g of AH salt, 27.8 g of hexamethylenediamine (60%) and 115.1 g of azelaic acid were condensed to give a pre-polymer under a nitrogen atmosphere at temperatures of 180° C. to 250° C. 442.0 g of polycaprolactone-diol with an average molar mass of approximately 1,000 g/mole as well as 0.8 g of an esterification catalyst were introduced, with stirring, into the melt comprising the coPA pre-polymer. A vacuum was applied; the final pressure was approximately 1 mbar.

Example 12

239.6 9 of AH salt, 177.3 9 of hexamethylenediamine (60%) and 269.4 g of azelaic acid were condensed to give a pre-polymer under a nitrogen atmosphere at temperatures of 180° to 250° C. 380.0 g of polycaprolactone-diol with an average molar mass of approximately 780 g/mole and 1.6 g of an esterification catalyst were introduced, with stirring, into the melt comprising the coPA pre-polymer. A vacuum was applied; the final pressure was approximately 1 mbar.

Example 13

96.4 g of AH salt, 72.3 g of hexamethylenediamine (60%) and 137.1 g of azelaic acid were condensed to give a pre-polymer under a nitrogen atmosphere at temperatures of 180° C. to 250° C. 673.5 g of polycaprolactone-diol with an average molar mass of approximately 2,000 g/mole and 0.8 g of an esterification catalyst were introduced, with stirring, into the melt comprising the coPA pre-polymer. A vacuum was applied; the final pressure was approximately 1 mbar.

Example 14

200.8 g of AH salt, 148.2 g of hexamethylenediamine (60%) and 184.9 g of azelaic acid were condensed to give a pre-polymer under a nitrogen atmosphere at temperatures of 180° C. to 250° C. 423.6 g of Priplast® 3194 with an average molar mass of approximately 2,000 g/mole and 1.6 g of an esterification catalyst were introduced, with stirring, into the melt comprising the coPA pre-polymer. A vacuum was applied; the final pressure was approximately 1 mbar.

Example 15

200.8 g of AH salt, 148.2 g of hexamethylenediamine (60%) and 184.9 g of azelaic acid were condensed to give a pre-polymer under a nitrogen atmosphere at temperatures of 180° C. to 250° C. 399.6 g of Priplast® 3192 with an average molar mass of approximately 2,000 g/mole and 1.6 g of an esterification catalyst were introduced, with stirring, into the melt comprising the coPA pre-polymer. A vacuum was applied; the final pressure was approximately 1 mbar.

Example 16

Preparation of flat foils and injection moldings

The molding compositions that were obtained in Examples 1 to 13 were granulated together with cooling and then were dried to give a water content below 0.1% prior to further thermoplastic processing. Drying was accomplished in a vacuum drying cabinet at 50° C. and 20 mbar.

Flat foils with thickness of 50 to 200 mm were prepared with a Brabender laboratory extruder that was equipped with a nozzle for flat foils and a roller removal system.

Rods for tensile testing in accordance with the appropriate DIN standard and small beams for testing in accordance with the appropriate DIN standard were injection-molded by means of a 320-210-750 Arburg Allrounder.

Example 17

Degradation characteristics

The biological degradability was investigated using foils with an average thickness of 50 mm and a size of 100 cm$^2$ in a laboratory composting system. As the composting raw material, a standard composition in accordance with the work of O. J. Huennerkopf was used. Fruit and vegetable offal served as the inoculum.

The test foils and the composting raw materials were transferred into Dewar vessels with a capacity of approximately 4 liters and aerated into the active state by means of a system of tubes. The temperature increase within the first few days of rotting amounted to approximately 10° C./day. After 5 to 7 days, it was possible to measure temperatures of 60° C. to 67° C. After a further 5 to 7 days, the composting mass began to cool off again and it reached a temperature of 26° C. to 32° C. after an incubation time of 4 weeks. After opening and mixing the composting mass, a lesser temperature increase was registered in all cases.

Changes in the test foils within the first 4 to 8 weeks: The test foils became yellow to brown in color and mostly lost their transparency and exhibited fissures and holes over the entire surface of the foils. The foils had become thinner; sharp edges were no longer present and whole portions were frequently missing. The tensile strength and the tensile extension decreased dramatically during the course of composting.

After 12 weeks of composting, most of the foils could no longer be found again; the pieces of foil corresponding to the materials that were still present had lost mass very markedly and had partially disintegrated. On further composting, these materials become completely degraded as well.

The loss in mass, categorized after incubation times of 4, 8 and 12 weeks, is set out in Table 1. The mechanical properties of the block copolyester-polyamides according to the invention and in accordance with Examples 1 to 15 are also summarized in the following Table 1.

TABLE 1

| Example | Ester/amide ratio | $n_{rel}$[4] | Melting point [°C.] | Terminal groups COOH | Terminal groups OH | Tensile E-modulus [N/mm$^2$] | Ultimate tensile strength [N/mm$^2$] | Elongation at break [N/mm$^2$] | SZ[2] 23° C. [kJ/m$^2$] | SZ[2] −20° C. [kJ/m$^2$] | KSZ[3] 23° C. [kJ/m$^2$] | KSZ[3] −20° C. [kJ/m$^2$] | Loss in mass in the composting system [4/8/12 weeks] [%] |
|---|---|---|---|---|---|---|---|---|---|---|---|---|---|
| 1 | 0.96 | 1.59 | 165 | 81 | 25 | 380 | 72 | 480 | o.B. | o.B. | o.B. | 20 | 14/33/88 |
| 2 | 1.75 | 1.63 | 166 | 73 | 34 | 150 | — | — | o.B. | o.B. | o.B. | o.B. | 30/76/100 |
| 3 | 1.31 | 1.51 | 166 | 107 | 31 | 300 | — | — | o.B. | o.B. | o.B. | o.B. | 35/72/100 |
| 4 | 1.46 | 1.52 | 168 | 93 | 12 | 270 | — | — | o.B. | o.B. | o.B. | o.B. | — |
| 5 | 0.53 | 1.72 | 176 | 58 | 42 | 650 | 80 | 480 | o.B. | o.B. | o.B. | 20 | — |
| 6 | 1.53 | 1.56 | 157 | 31 | 57 | 240 | 55 | 400 | o.B. | o.B. | o.B. | o.B. | 18/63/100 |
| 7 | 2.09 | 1.62 | 159 | 95 | 24 | 130 | 40 | 380 | o.B. | o.B. | o.B. | o.B. | — |
| 8 | 2.19 | 1.48 | 160 | 127 | 33 | 110 | 39 | 420 | o.B. | o.B. | o.B. | o.B. | — |
| 9 | 0.88 | 1.67 | 160 | 81 | 28 | 400 | 70 | 520 | o.B. | o.B. | o.B. | o.B. | — |
| 10 | 1.01 | 1.41 | 188 | 29 | 88 | 550 | — | — | — | — | — | — | 22/77/100 |
| 11 | 1.00 | 1.48 | 207 | 50 | 67 | 780 | — | — | — | — | — | —c | 26/65/100 |
| 12 | 0.69 | 1.45 | 163 | 30 | 74 | 510 | 78 | 440 | o.B. | o.B. | o.B. | 15 | — |
| 13 | 2.69 | 1.53 | 157 | 63 | 42 | 70 | 25 | 400 | o.B. | o.B. | o.B. | o.B. | 44/100 |
| 14 | 0.96 | 1.65 | 167 | 88 | 32 | — | — | — | — | — | — | — | — |
| 15 | 0.95 | 1.60 | 167 | 50 | 75 | — | — | — | — | — | — | — | — |

Comments in regard to Table 1:
[1]Tensile E-modulus measured using DIN-based tensile rods in accordance with DIN 53457
[2]Tensile extension/tensile strength measured on flat foils (50 to 100 mm) in accordance with ISO 1184
[2]SZ = impact strength measured using small DIN-based beams in accordance with DIN 53453
[3]KSZ = impact strength measured using small notched DIN-based beams in accordance with DIN 53453 (Charpy)
[4]$n_{rel}$ = 0.5% m-cresol (DIN 53727)
o.B. = without any fracture
— = not measured

TABLE 2

Titration values of the polyols used in Examples 1 to 15

|  | | µeq/g OH |
|---|---|---|
| Polycaprolactone-diol with a molar mass of | approx. 780 | 2549 |
| Polycaprolactone-diol with a molar mass of | approx. 1000 | 1822 |
| Polycaprolactone-diol with a molar mass of | approx. 2000 | 1040 |
| Polycaprolactone-diol with a molar mass of | approx. 1000 | 2952 |
| Priplast ® 3192 with a molar mass of | approx. 2000 | 1059 |
| Priplast ® 3194 with a molar mass of | approx. 2000 | 996 |

I claim:

1. A process for the manufacture of a biologically degradable, partially crystalline block copolyester-polyamide comprising the steps a) polycondensation of at least one amide to form pre-polymerized polyamide blocks and/or copolyamide blocks having a defined number average molar mass not exceeding 3,000 g/mole, and then b) admixture of the pre-polymerized polyamide and/or copolyamide blocks with one or more polyester components selected from the group consisting of polyester blocks, copolyester blocks and copolyester-polyamide blocks, and c) polycondensation of the admixture under a vacuum in the presence of a condensation catalyst, controlling temperature, pressure, catalyst and catalyst concentration such that no exchange reaction takes place, until a block copolyester-polyamide is formed in which the average molar mass and molar mass distribution of the polyester and polyamide blocks is the same prior to and after condensation.

2. The process according to claim 1, wherein the polycondensation reactions are carried out at a temperature of 180° C. to 260° C. and at a pressure in the range from atmospheric pressure up to 18 bar, and wherein the pressure is gradually relieved in step (c), following which a vacuum is applied.

* * * * *